United States Patent Office 3,146,220
Patented Aug. 25, 1964

3,146,220
HALOGEN CONTAINING POLYURETHANE RESINS
Raymond R. Hindersinn, Lewiston, and Michael Worsley, Niagara Falls, N.Y., assignors to Hooker Chemical Corporation, Niagara Falls, N.Y., a corporation of New York
No Drawing. Filed Nov. 18, 1959, Ser. No. 853,687
14 Claims. (Cl. 260—77.5)

This invention relates to novel resinous compositions and method for preparing same. More particularly, the present invention resides in polyurethane compositions useful for many applications, for example in the preparation of flame retardant rigid and flexible polyurethane foams, flame retardant polyurethane surface coatings, flame retardant polyurethane elastomers or synthetic rubbers, flame retardant adhesives, etc.

The methods of the prior art have attained fire-resistance in rigid foams by the use of various plasticizing substances, such as the various phosphate or phosphonate esters or chlorinated compounds. However, such plasticizing substances are additives which are not chemically combined with the polyurethane plastic and are progressively lost from the plastic by evaporation, leaching, etc. Consequently, the product does not have a permanently reduced flammability. Furthermore, the plasticizing additive affects the physical properties of the product. Alternatively, the art has incorporated chlorine containing compounds into the resultant product, for example, S.N. 623,795, "Fire Resistant Foams," filed November 23, 1956. This method, although it overcomes the disadvantages inherent in the use of plasticizing substances, suffers from the serious disadvantage that the incorporation of the chlorine containing compound into the polyester causes a rapid increase in viscosity, and solid compositions usually result at a chlorine content greater than fifteen percent, therefore requiring special handling in order to obtain a polyurethane foam of high chlorine content.

Most flexible polyurethane foams are claimed to be fire resistant per se and, therefore, very little has been done to increase the fire resistance of these materials. The claimed fire resistance, however, usually is based on the fact that such materials are self extinguishing when the foams are ignited by virtue of the fact that the burning elastomeric material melts and falls away from the article thus extinguishing the flame. The melt, however, is flammable and will burn if ignited.

It is, therefore, an object of the present invention to provide a resinous composition which is useful in the preparation of flame retardant rigid and flexible polyurethane foams, adhesives, coating compositions and elastomers, which composition is liquid at room temperature and thereby may be handled by conventional metering and pumping equipment. It is a further object of the present invention to obtain a resinous composition which is easily prepared and can be used to easily and inexpensively prepare products having excellent physical characteristics. An additional object is to prepare truly fire resistant polymers and polymeric materials which are non-flammable both in the solid and molten state. Further objects and advantages will appear hereinafter.

In accordance with the present invention, it has been found that high halogen containing, resinous polyurethane compositions which are liquid at room temperature may be prepared by adding (I) a halogen containing polyhydric alcohol derived from hexahalocyclopentadiene, wherein the halogen is selected from the group consisting of chlorine, bromine, fluorine and mixtures thereof, to (II) an organic polyisocyanate in the ratio of one hydroxyl group to at least four isocyanate groups.

The diisocyanate or polyisocyanate that may be employed is preferably liquid in order to readily react with the solid halogen containing polyhydric alcohol. Aromatic isocyanates are preferred because they are more reactive and less toxic than the aliphatic members. Typical isocyanates include the following: 2,4-tolylene diisocyanate; 2,6-tolylene diisocyanate; hexamethylene diisocyanate; ethylene diisocyanate; trimethylene diisocyanate; tetramethylene diisocyanate; pentamethylene diisocyanate; 1,2-propylene diisocyanate; 1,2-butylene diisocyanate; 2,3-butylene diisocyanate; 1,3-butylene diisocyanate; the liquid reaction products of (1) diisocyanates and (2) polyols or polyamines, etc. In addition, mixtures of isocyanates may be employed. The preferred isocyanates are the diisocyanates, especially mixtures thereof, because they are readily available commercially.

Typical halogen containing polyhydric alcohols derived from hexahalocyclopentadiene are (1) the reaction products of hexahalocyclopentadiene and a dihydric alcohol containing aliphatic carbon to carbon unsaturation and (2) the reaction products of decachlorooctahydro-1,3,4-metheno-2-H-cyclobuta-[cd]-pentalene-2-one and a polyhydric alcohol containing at least three hydroxyl groups. Examplificative reaction products of hexahalocyclopentadiene and a dihydric alcohol are: 1,4,5,6,7,7-hexachloro-2,3-bis-hydroxymethylbicyclo-(2.2.1)-5-heptene; 1,4,5,6,7,7-hexabromo-2,3-bis-hydroxymethylbicyclo-(2.2.1)-5 - heptene; 1,4,5,6-tetrachloro-7,7-difluoro-2,3-bis-hydroxymethylbicyclo-(2.2.1)-5-heptene; 3-(1,4,5,6-tetrachloro-7,7-difluorobicyclo-(2.2.1)-5-heptene-2-yl)-methoxy - 1,2 - propane diol; 3-(1,4,5,6,7,7-hexachlorobicyclo-(2.2.1)-5-heptene-2-yl)methoxy-1,2-propane diol. The preparation of these compounds is disclosed in copending application Serial Number 308,922 for "Polyhalogen-Containing Polyhydric Compounds," filed September 10, 1952, by Paul Robitschek et al., now U.S. Patent No. 3,007,958. Typical dihydric alcohols which may be reacted with hexahalocyclopentadiene are: butenediol: allyl glycerol ether; penetenediol; 1,2-bis-(hydroxymethyl)-cyclohexene-4; 1,2-bis-(hydroxymethyl)-cyclohexadiene-1,4; 1,2-bis-(hydroxymethyl)-bicyclo-(2.2.1)-heptene-4; cis-1,2-dihydroxycyclopentene-3; and more generally those of the lower aliphatic and alicyclic series having at least one reactive unsaturated carbon-to-carbon bond and at least two hydroxyl groups. Halogenated dihydric compounds may also be advantageously used, for example: 1,4-dihydroxy-2-chlorobutene-2; 1,5-dihydroxy-2,4-dichloropentene-2; 1,2-bis-(hydroxymethyl)-4 - chlorocyclohexene - 4; 1,2 - bis-(hydroxymethyl)-4-chlorocyclohexadiene-1,4; 1,2-bis-(hydroxymethyl)-5-chlorobicyclo-(2.2.1)-heptadiene-1,4; etc.

Typical polyhydric alcohols used in the preparation of the reaction products of decachlorooctahydro-1,3,4-metheno-2H-cyclobuta-[cd]-pentalene-2-one and a trihydric alcohol are: glycerol; butanetriol; hexanetriol; trimethylol propane; trimethylol ethane; pentaerylthritol; dipentaerythritol; etc. Decachlorotetrahydro-4,7-methanoindene-one is the name formerly given to decachlorooctahydro-1,3,4-metheno-2H-cyclobuta[cd]-pentalene-2-one and may be prepared by treating hexachlorocyclopentadiene with sulfur trioxide. The polyol derivatives may be easily prepared by refluxing decachlorooctahydro-1,3,4-metheno-2H-cyclobuta[cd]-pentalene-2-one and the desired polyol in carbon tetrachloride. The products are readily crystallized.

In the preparation of the reaction products of the present invention, the halogen containing polyhydric alcohol is added to the isocyanate, preferably portionwise, at a temperature of from about thirty to one hundred and twenty degrees centigrade. Higher or lower temperatures may be used as desired. The ratios employed of halogen containing polyhydric alcohol to polyisocyanate are such as to provide one hydroxyl group to at least four isocyanate groups. After the polyisocyanate and the halogen containing polyhydric alcohol are mixed together, the reaction product is heated at a temperature preferably from about one hundred and ten to one hundred and sixty degrees centigrade for preferably from about thirty minutes to one hour and thirty minutes.

The resinous reaction products of the present invention may be reacted with a hydroxyl containing polyester or polyether in the presence of a foaming agent such as trichlorofluoromethane, etc., and optionally a catalyst may be employed. The catalyst employed may be any of the known conventional catalysts for isocyanate reactions, such as tertiary amines, for example, triethylamine, N-methyl morpholine, triethanolamine, etc., or antimony compounds such as disclosed and claimed in Serial Number 803,820, for example, antimony caprylate, antimony naphthenate or antimonous chloride. In addition, tin compounds may be employed such as disclosed and claimed in Serial Number 803,819, for example, dibutyltin dilaurate, tri-n-octyltin oxide, hexabutylditin, tributyltin phosphate or stannic chloride. Rigid or flexible polyurethane foams are thereby obtained. The rigid polyurethane foams utilize a highly branched hydroxyl rich polyester or polyether having a hydroxyl number of between about two hundred and six hundred and fifty. The flexible polyurethane foams utilize a linear, relatively hydroxyl poor polyester or polyether having a hydroxyl number of between about thirty and one hundred. If a polyester or polyether with a hydroxyl number of between about one hundred and two hundred is employed, a semi-rigid polyurethane foam is obtained. These foamed compositions are self-curing and require no additional heat. This is a significant advantage as it allows for each of handling and simplicity of processing. The fact that a high halogen containing foam would cure at room temperature is unexpected and surprising.

The polyesters employed are known in the art and are the reaction products of a polyhydric alcohol and a polycarboxylic compound, i.e., a polycarboxylic acid, polycarboxylic acid anhydride, polycarboxylic acid halide or polycarboxylic acid ester, or mixtures thereof.

The polyethers are the reaction products known in the art and are the products of either a polyhydric alcohol or a polycarboxylic acid with a monomeric 1,2-epoxide possessing a single 1,2-epoxy group, such as for example, propylene oxide.

The fire-resistant surface coatings prepared from the reaction products of the present invention are prepared by reacting the reaction products of the present invention with low molecular weight polyesters or polyethers in the presence of an inert solvent. Alternatively, fire-resistant surface coatings may be obtained by reacting the reaction products of the present invention with liquid hydroxyl containing glycerides in the presence of an inert solvent. In each case, appropriate reaction catalysts may be employed if desired.

Fire-resistant elastomers or synthetic rubbers may be obtained by reacting the reaction products of the present invention with a linear polyester or polyether, preferably in the presence of a reaction catalyst. The resultant product is then milled, etc., by procedures known to the art. Optionally, fillers and modifying agents such as are known to the art are employed.

Fire-resistant adhesives may also be obtained in the conventional manner. A solvent may or may not be employed and the adhesives are preferably prepared in the presence of a reaction catalyst.

The following examples are found.

EXAMPLE 1

*Resinous Reaction Product Based on 1,4,5,6,7,7-Hexachloro-2,3-Bis-Hydroxymethylbicyclo-(2.2.1) - 5 - Heptene*

One hundred and seventy-five grams of 1,4,5,6,7,7-hexachloro-2,3-bis-hydroxymethylbicyclo-(2.2.1) - 5 - heptene was added slowly to four hundred grams of a mixture of eighty percent 2,4-tolylene diisocyanate and twenty percent 2,6-tolylene diisocyanate at a temperature of one hundred degrees centigrade. After the final addition, the temperature was raised to one hundred and fifteen degrees centigrade and held there for one-half hour. The product was cooled and discharged to yield a resinous composition having the following characteristics:

|  | Percent |
| --- | --- |
| NCO content | 25.6 |
| Cl content | 17.7 |
| Gardner viscosity at 25° C | 23.7 |

EXAMPLE 2

*Resinous Reaction Product Based on the 1,2,4-Butanetriol Adduct of Decachlorooctahydro-1,3,4 - Metheno - 2H-Cyclobuta[cd]-Pentalene-2-One*

Eighty-eight grams of the 1,2,4-butanetriol adduct of decachlorooctahydro-1,3,4-metheno-2H - cyclobuta[cd]-pentalene-2-one was added slowly to three hundred and fifty grams of a mixture of eighty percent 2,4-tolylene diisocyanate and twenty percent 2,6-tolylene diisocyanate at one hundred degrees centigrade. After the final addition of the adduct the temperature was raised to one hundred and twenty degrees centigrade for one-half hour. The product was cooled and discharged to yield a resinous composition of the following characteristics:

|  | Percent |
| --- | --- |
| NCO content | 36.2 |
| Cl content | 12 |

The infrared analysis did not show the presence of free OH groups.

EXAMPLE 3

*Preparation of a Flexible Foam From Example 1*

To two hundred and forty-four grams of polypropylene glycol having a molecular weight about 2000 and a hydroxyl number of fifty-six, was added five grams 1,2,6-hexanetriol, 8.5 grams water, two grams dibutyltin dilaurate and 1.5 grams silicone oil. Two hundred grams of the resinous material from Example 1 was added to this mixture. After twenty seconds of mixing, the mixture was poured into a mold and permitted to rise at room temperature. After rising the mold was placed in an oven at ninety degrees centrigrade for fifteen minutes. The final foam was elastomeric in character, had a density of 3 lb./ft.$^3$, was self-extinguishing, and the molten material was also self-extinguishing.

EXAMPLE 4

*Preparation of a Fexible Foam From Example 2*

To two hundred grams of polypropylene glycol having a molecular weight about 2000, and a hydroxyl number of fifty-six, was added 1.4 grams dibutyltin dilaurate, one gram silicone oil and six grams water. To this mixture was added one hundred and two grams of the resinous material from Example 2, and the mixture stirred rapidly for twenty seconds. The mixture was then poured into a mold, permitted to rise at room temperature and finally cured at ninety degrees centigrade for fifteen minutes. The final foam was elastomeric in character, was self-extinguishing, and the molten material was also self-extinguishing.

EXAMPLE 5

*Preparation of a Rigid Foam From Example 1*

To one hundred and thirty-five grams of a polyester, comprised of five moles trimethylolpropane and three moles adipic acid condensed to an acid number of less than one, and having a hydroxyl number of five hundred and four, was added 0.3 grams dibutyltin dilaurate, 0.3 gram N-methyl morpholine and 0.7 gram silicone oil. A solution of two hundred grams of the resinous material from Example 1, and fifty grams trichlorofluoromethane was stirred rapidly into the polyester component and mixed for thirty seconds, then poured into a mold. The foam expanded at room temperature, went through a brittle stage, but cured in twenty-four hours at ambient temperatures. The final product had a density of 2.4 lb./ft.$^3$, had very fine cell structure, and was fire retardant.

EXAMPLE 6

*Preparation of a Rigid Foam From Example 2*

To one hundred and fifty grams polyester, comprised of five moles trimethylol propane and three moles adipic acid condensed to an acid number of less than one and having a hydroxyl number of five hundred and four, was added fifty grams of the 1,2,4-butanetriol adduct of decachlorooctahydro - 1,3,4-metheno-2H-cyclobuta[cd]-pentalene-2-one, 0.5 gram dibutyltin dilaurate, 0.5 gram N-methyl morpholine and 1.0 gram silicone oil. To this mixture was added a solution of one hundred and eighty-seven grams of the resinous material of Example 2, and fifty-eight grams of trichlorofluoromethane. The mixture was stirred rapidly for twenty seconds, then poured into a mold. The foam expanded at room temperature and cured within twenty-four hours at ambient temperatures. The final product had fine cell structure and was fire retardant.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

We claim:
1. The liquid resinous, substantially isocyanate-terminated, reaction product of (I) a halogen containing polyhydric alcohol selected from the group consisting of (A) the reaction product of hexahalocyclopentadiene wherein the halogen is selected from the group consisting of chlorine, bromine, fluorine and mixtures thereof, and a dihydric alcohol containing aliphatic carbon-to-carbon unsaturation and (B) the reaction product of decachlorooctahydro - 1,3,4-metheno-2H-cyclobuta[cd]-pentalene-2-one and a polyhydric alcohol containing at least three hydroxyl groups, and (II) an organic polyisocyanate.

2. The product of claim 1 wherein the halogen containing polyhydric alcohol is the reaction product of hexahalocyclopentadiene and a dihydric alcohol containing aliphatic carbon-to-carbon unsaturation.

3. The product of claim 1 wherein the halogen containing polyhydric alcohol is the reaction product of decachlorooctahydro - 1,3,4-metheno-2H-cyclobuta[cd]-pentalene-2-one and a polyhydric alcohol containing at least three hydroxyl groups.

4. The product of claim 2 wherein the halogen containing polyhydric alcohol is 1,4,5,6,7,7-hexachloro-2,3-bis-hydroxymethylbicyclo-(2.2.1)-5-heptene.

5. The product of claim 3 wherein the halogen containing polyhydric alcohol is the reaction product of decachlorooctahydro - 1,3,4-metheno-2H-cyclobuta[cd]-pentalene-2-one and 1,2,4-butanetriol.

6. The product of claim 4 wherein the organic polyisocyanate is tolylene diisocyanate.

7. The product of claim 4 wherein the organic polyisocyanate is a mixture of 2,4-tolylene diisocyanate and 2,6-tolylene diisocyanate.

8. A process for preparing a liquid resinous reaction product which comprises adding (I) a halogen containing polyhydric alcohol selected from the group consisting of (A) the reaction product of hexahalocyclopentadiene wherein the halogen is selected from the group consisting of chlorine, bromine, fluorine and mixtures thereof, and a dihydric alcohol containing aliphatic carbon-to-carbon unsaturation and (B) the reaction product of decachlorooctahydro - 1,3,4 - metheno-2H-cyclobuta[cd]-pentalene-2-one and a polyhydric alcohol containing at least three hydroxyl groups, to (II) an organic polyisocyanate in the ratio of one hydroxyl group to at least four isocyanate groups.

9. A process according to claim 8 wherein the halogen containing polyhydric alcohol is the reaction product of hexahalocyclopentadiene and a dihydric alcohol containing aliphatic carbon-to-carbon unsaturation.

10. A process according to claim 8 wherein the halogen containing polyhydric alcohol is the reaction product of decachlororoocetahydro-1,3,4-metheno-2H-cyclobuta[cd]-pentalene-2-one and a polyhydric alcohol containing at least three hydroxyl groups.

11. A process according to claim 9 wherein the halogen containing polyhydric alcohol is 1,4,5,6,7,7-hexachloro-2,3-bis-hydroxymethylbicyclo-(2.2.1)-5-heptene.

12. A proces according to claim 10 wherein the halogen containing polyhydric alcohols is the reaction product of decachlorooctahydro-1,3,4-metheno-2H-cyclobuta[cd]-pentalene-2-one and 1,2,4-butanetriol.

13. A process according to claim 11 wherein the organic polyisocyanate is tolylene diisocyanate.

14. A process according to claim 11 wherein the organic polyisocyanate is a mixture of 2,4-tolylene diisocyanate and 2,6-tolylene diisocyanate.

References Cited in the file of this patent

UNITED STATES PATENTS

| | | |
|---|---|---|
| 2,841,485 | Johnson et al. | July 1, 1958 |
| 3,055,849 | Hindersinn et al. | Sept. 25, 1962 |
| 3,055,948 | Hoch et al. | Sept. 25, 1962 |

FOREIGN PATENTS

| | | |
|---|---|---|
| 772,212 | Great Britain | Apr. 10, 1947 |
| 567,045 | Canada | Dec. 2, 1958 |
| 960,989 | Germany | Mar. 28, 1957 |